United States Patent
Mizushima

(10) Patent No.: US 11,710,999 B2
(45) Date of Patent: Jul. 25, 2023

(54) MANUFACTURING METHOD OF STATOR

(71) Applicants: TOYOTA JIDOSHA KABUSHIKI KAISHA, Toyota (JP); DENSO CORPORATION, Kariya (JP)

(72) Inventor: Daisuke Mizushima, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 17/514,517

(22) Filed: Oct. 29, 2021

(65) Prior Publication Data
US 2022/0247285 A1    Aug. 4, 2022

(30) Foreign Application Priority Data

Jan. 29, 2021 (JP) .................... 2021-012751

(51) Int. Cl.
*H01F 7/06* (2006.01)
*H02K 15/00* (2006.01)
*B23K 37/04* (2006.01)

(52) U.S. Cl.
CPC ..... *H02K 15/0081* (2013.01); *B23K 37/0435* (2013.01)

(58) Field of Classification Search
CPC ............ B23K 37/0435; B23K 37/0443; H02K 15/0081
See application file for complete search history.

(56) References Cited

U.S. PATENT DOCUMENTS

| 6,865,796 B1* | 3/2005 | Oohashi .................. H02K 3/12 |
| | | 242/432 |
| 2017/0126106 A1 | 5/2017 | Mizushima et al. |
| 2019/0084098 A1* | 3/2019 | Yoneyama ............... H02K 3/04 |
| 2021/0359579 A1* | 11/2021 | Fukuda .................... H02K 3/38 |
| 2022/0239176 A1* | 7/2022 | Nakayama ............. H02K 3/345 |

FOREIGN PATENT DOCUMENTS

| JP | 2014-151360 A | | 8/2014 |
| JP | 2015134359 A | * | 7/2015 |
| JP | 2017-085806 A | | 5/2017 |
| JP | 2021-087309 A | | 6/2021 |

\* cited by examiner

*Primary Examiner* — Paul D Kim
(74) *Attorney, Agent, or Firm* — Sughrue Mion, PLLC

(57) ABSTRACT

A manufacturing method of a stator according to the disclosure includes a clamping process of clamping, among coil ends of segment coils assembled into a stator core, a pair of coil ends adjacent to each other in a circumferential direction, by a clamp jig that presses the pair of coil ends in the circumferential direction, and a welding process of welding the coil ends exposed through an opening portion provided in the clamp jig. The clamp jig includes a pressuring structure that increases a pressing force in a direction away from weld faces of the coil ends welded in the welding process, the pressuring structure being provided on at least one of sideward pressing faces that come into contact with side faces of the coil ends that are provided orthogonal to the weld faces.

5 Claims, 13 Drawing Sheets

FIG. 14
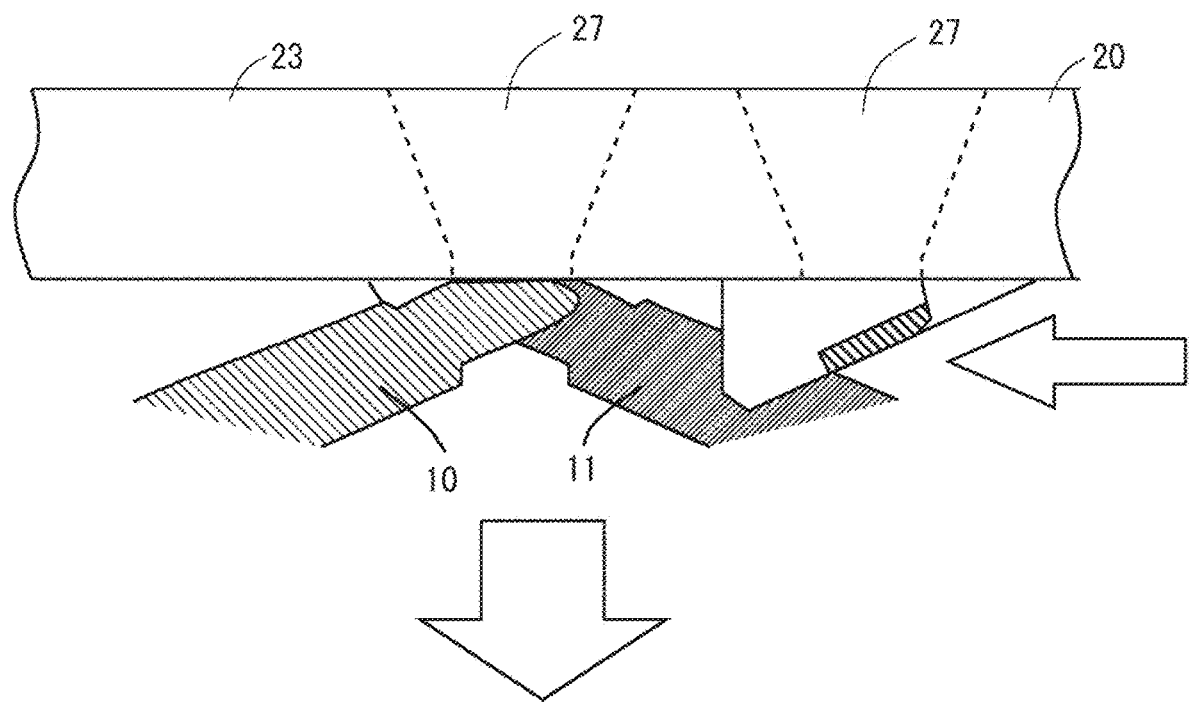
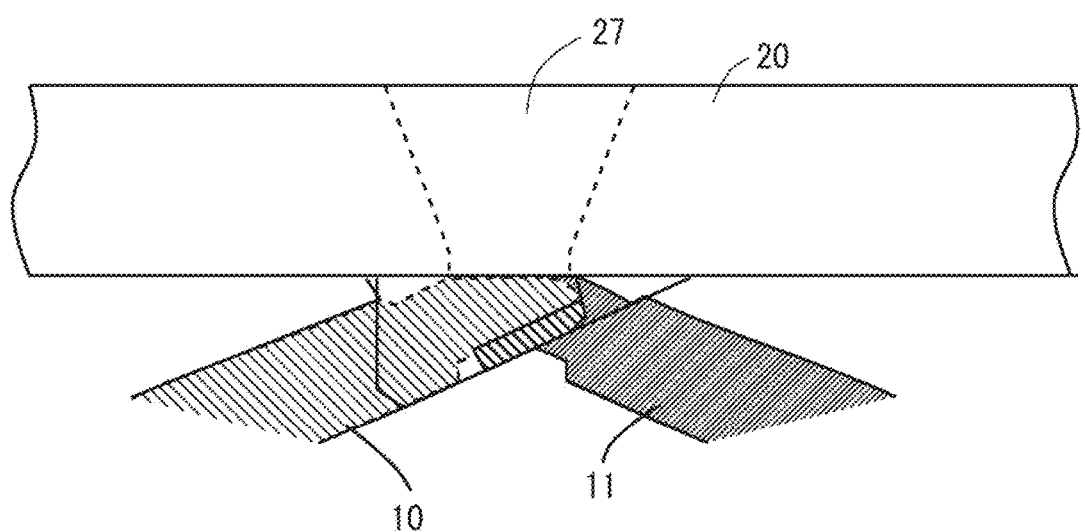

MANUFACTURING METHOD OF STATOR

CROSS-REFERENCE TO RELATED APPLICATION

This application claims priority to Japanese Patent Application No. 2021-012751 filed on Jan. 29, 2021, incorporated herein by reference in its entirety.

BACKGROUND

1. Technical Field

The disclosure relates to a manufacturing method of a stator and to a clamp jig, and for example, relates to a manufacturing method of a stator in which adjacent coil ends out of segment coils assembled into a stator core are welded, and to a clamp jig used at the time of the welding.

2. Description of Related Art

Segment coils configuring electric current paths within a stator core are assembled into a stator. These segment coils are assembled therein as divided electric wires, and accordingly the end portions of the segment coils have to be welded, such that these divided electric wires form an integrated electric current path. An example of a welding method of the segment coils is disclosed in Japanese Unexamined Patent Application Publication No. 2017-85806 (JP 2017-85806 A).

The joining method described in JP 2017-85806 A is a joining method of coil ends. When tapered portions having tapered shapes are formed on coil ends, a pair of first pressing jigs provided with a pair of claw portions fitting the tapered portion is brought into close proximity with the coil ends in the axial direction of a stator core and presses a pair of the tapered portions, the claw portions are fit so as to grip the tapered portions from the circumferential direction and fix the positions of the tapered portions in the axial direction, the tapered portions are gripped from an inner side and an outer side in the radial direction by a pair of second pressing jigs to bring the tapered portions into contact and fix the positions of the tapered portions in the radial direction, and the contacting portions of the tapered portions are welded.

SUMMARY

Thus, potential difference measurement on the joined coil ends is performed to measure the joining area. Specifically, following formation of an oxide film on the end portions of each of the segment coils, the end portions of the segment coils are laser-welded to each other, electric current is applied across the two laser-welded segment coils, and a potential difference is measured. When performing potential difference measurement according to this measurement technique, electricity flows to portions other than the welded portions when unwelded coil ends are electrically in contact with each other, and this results in error in the measurement results. However, the technology described in JP 2017-85806 A makes no disclosure nor suggestion of a proposal to reduce such measurement error.

The present disclosure has been made to solve such a problem, and it is an object thereof to reduce measurement error of weld area at welded parts provided at segment coil end portions.

An aspect of a manufacturing method of a stator according to the disclosure is a manufacturing method of a stator, the manufacturing method having a segment coil assembling process of attaching segment coils to a stator core such that coil ends that are exposed are bent toward sides opposite to each other in a circumferential direction, while the segment coils are in a state of being attached to slots of the stator core at predetermined positions provided from an inner side in a radial direction of the stator core toward an outer side in the radial direction of the stator core; a clamping process of clamping, among the coil ends of the segment coils assembled into the stator core, a pair of coil ends adjacent to each other in the circumferential direction, by a clamp jig that presses the pair of coil ends in the circumferential direction; and a welding process of welding the pair of coil ends exposed through an opening portion provided in the clamp jig. The clamp jig includes a pressuring structure that increases a pressing force in a direction away from weld faces of the coil ends welded in the welding process, the pressuring structure being provided on at least one of sideward pressing faces that come into contact with side faces of the coil ends that are provided orthogonal to the weld faces.

The manufacturing method may further include a quality determining process of determining quality of a weld of the coil ends by, following the welding process, bringing probes into contact with the weld faces of the coil ends to apply electric current, measuring a potential difference across the probes, and comparing the potential difference and a threshold value set in advance.

In the manufacturing method, the clamp jig may further include a downward pressing face that applies a pressing force toward the stator core to a region excluding a portion exposed through the opening portion at the weld faces.

In the manufacturing method, the pressuring structure may have a tapered shape in which a distance from the pressure structure to one of the side faces of the coil ends at a portion near the weld faces is longer than a distance from the pressure structure to the one of the side faces of the coil ends at a portion far from the weld faces, the one of the side faces facing the pressuring structure.

In the manufacturing method, a portion with the tapered shape may have an inclination that is equal to or smaller than 85° from a reference plane that extends in a direction of a sideward pressing force being applied by the clamp jig.

In the manufacturing method, the pressuring structure may be configured with a slant matching an inclination of each of lower faces of the coil ends opposite to the weld faces.

An aspect of a clamp jig according to the disclosure is a clamp jig that presses in a circumferential direction a pair of coil ends adjacent to each other in the circumferential direction among coil ends of segment coils attached to a stator core such that the coil ends that are exposed are bent toward sides opposite to each other in the circumferential direction while the segment coils are in a state of being attached to slots of the stator core at predetermined positions provided from an inner side in a radial direction of the stator core toward an outer side in the radial direction of the stator core, the clamp jig having an opening portion through which weld faces of the coil ends are exposed in a state in which a pressing force is applied to the coil ends in a direction in which the coil ends are adjacent to each other; downward pressing faces that apply a pressing force toward the stator core to a region of the weld faces of the coil ends, the region excluding a portion exposed through the opening portion; and sideward pressing faces that come into contact with side faces of the coil ends, the side faces being provided so as to be orthogonal to the weld faces. At least one of the sideward pressing faces include a pressuring structure that increases the pressing force in a direction away from the weld faces.

The clamp jig may further include an inner circumferential ring provided on an inner circumferential side of the stator core; an outer circumferential ring with which the inner circumferential ring rotatably comes into contact, the outer circumferential ring being provided on the outer side of the inner circumferential ring; and a radial pusher that applies pressing force from an outer circumferential side of the stator core. The inner circumferential ring may include an inner-circumferential-side downward pressing face of the downward pressing faces, the inner-circumferential-side downward pressing face being configured to apply the pressing force to, out of the coil ends, an inner-circumferential-side coil end that is positioned on the inner circumferential side, and an inner-circumferential-side sideward pressing face of the sideward pressing faces, the inner-circumferential-side sideward pressing face being configured to come into contact with the inner-circumferential-side coil end. The outer circumferential ring may include an outer-circumferential-side downward pressing face of the downward pressing faces, the outer-circumferential-side downward pressing face being configured to apply the pressing force to an outer-circumferential-side coil end that is positioned on the outer circumferential side, out of the coil ends. The radial pusher may include an outer-circumferential-side sideward pressing face of the sideward pressing faces, the outer-circumferential-side sideward pressing face being configured to come into contact with the outer-circumferential-side coil end. The pressuring structure may be provided on at least one of the inner-circumferential-side sideward pressing face and the outer-circumferential-side sideward pressing face.

In the manufacturing method of a stator and the clamp jig according to the above aspects of the disclosure, a pair of coil ends among coil ends is welded in a state in which the pair of coil ends is clamped such that a pressure applied to the pair of coil ends is increased in a direction away from a welded part.

According to the above aspects of the disclosure, a measurement error of a weld area at a welded part provided at segment coil end portions can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 14 is a diagram illustrating movement of the clamp jig and the stator core when clamping the coil end using the clamp jig according to the first embodiment, FIG. 14 illustrating that the inner-circumferential ring is rotated at a faster speed than the stator core;

FIGS. 18A and 18B are graphs each showing variance in potential difference regarding a weld area measured in an inspecting process, in which FIG. 18A is a graph showing a potential difference regarding the weld area in the first embodiment measured in the inspecting process, whereas FIG. 18B is a graph showing a potential difference regarding the weld area in the comparative example measured in the inspecting process.

DETAILED DESCRIPTION OF EMBODIMENTS

Figure 1:
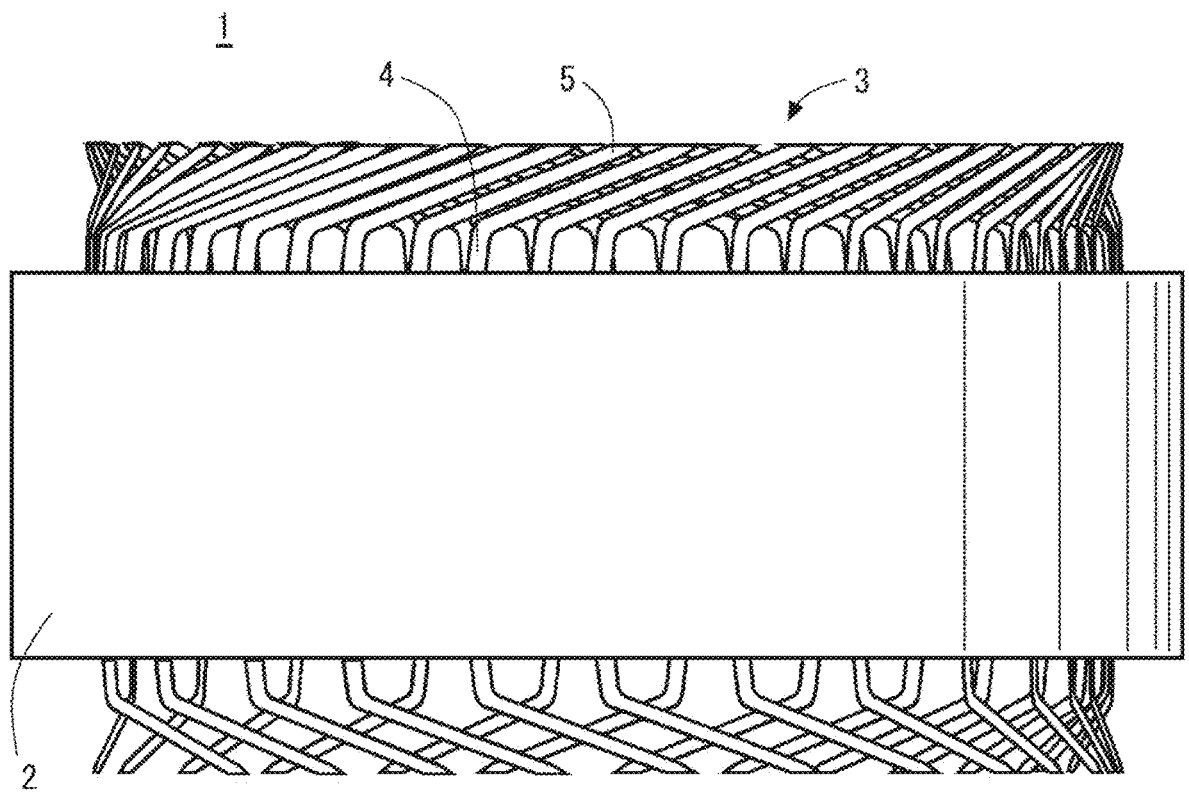
FIG. 1 is a schematic diagram of a stator core according to a first embodiment.

The following description and the drawings include omissions and simplifications as appropriate, for clarification of description. Also note that the same elements are denoted by the same signs in the drawings, and repetitive description will be omitted as necessary.

First Embodiment

Figure 2:
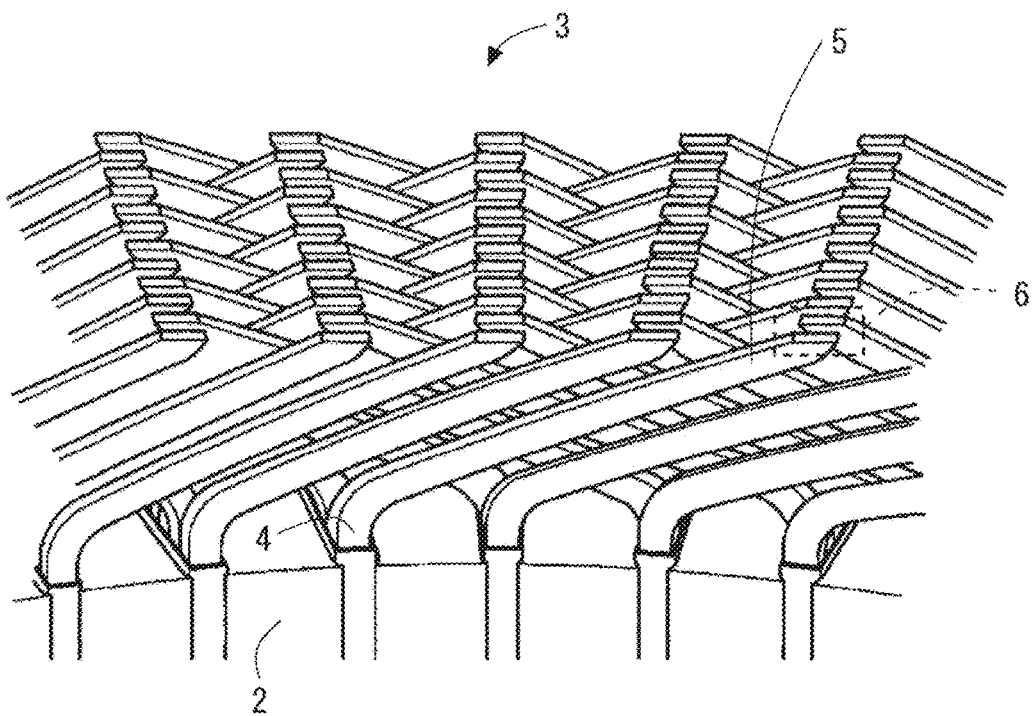
FIG. 2 is a diagram illustrating portions of segment coils to be joined.

FIG. 1 is a schematic diagram of a stator 1 according to a first embodiment. Also, FIG. 2 is a diagram illustrating portions of segment coils 4 to be joined. As illustrated in FIGS. 1 and 2, the stator 1 for a motor includes an annular-shaped stator core 2, and a plurality of the segment coils 4 for forming a coil 3 on the inner side of the stator core 2. The stator core 2 is formed by overlaying thin annular-shaped iron plates. The segment coils 4, which are formed in letter-U shapes, are arrayed on the inner side of the stator core 2 along the circumferential direction of the stator core 2. The segment coils 4 are layered in order from the inner side toward the outer side along the radial direction of the stator core 2. The segment coils 4 attached in this way thus form the coil 3.

Also, a pair of coil ends 5 of a pair of the segment coils 4 that are adjacent in the radial direction of the stator core 2 is bent toward sides opposite to each other in the circumferential direction of the stator core 2. The tips of the coil ends 5 are formed as tapered shapes. Also, the coil ends 5 are formed into shapes so that the tops thereof are cut to be parallel to the stator core 2. Thus, the height of the coil ends 5 in the axial direction of the stator core 2 is shortened. The tips of adjacent coil ends 5 are electrically connected by being welded to each other at a weld portion 6.

In this stator 1, the weld portions (places where an insulating coating has been removed) of the coil ends are arranged at intervals in the circumferential direction of the stator core 2. Now, by forming the coil ends so as to have tapered shapes, the insulating distance between the weld portions that are adjacent to each other in the circumferential direction of the stator core 2 can be increased. Increasing the insulating distance enables eddy current loss at the segment coils 4 to be reduced. The welding process of the adjacent coil ends 5, and clamp jigs used in the welding process, will be described below.

Figure 3:
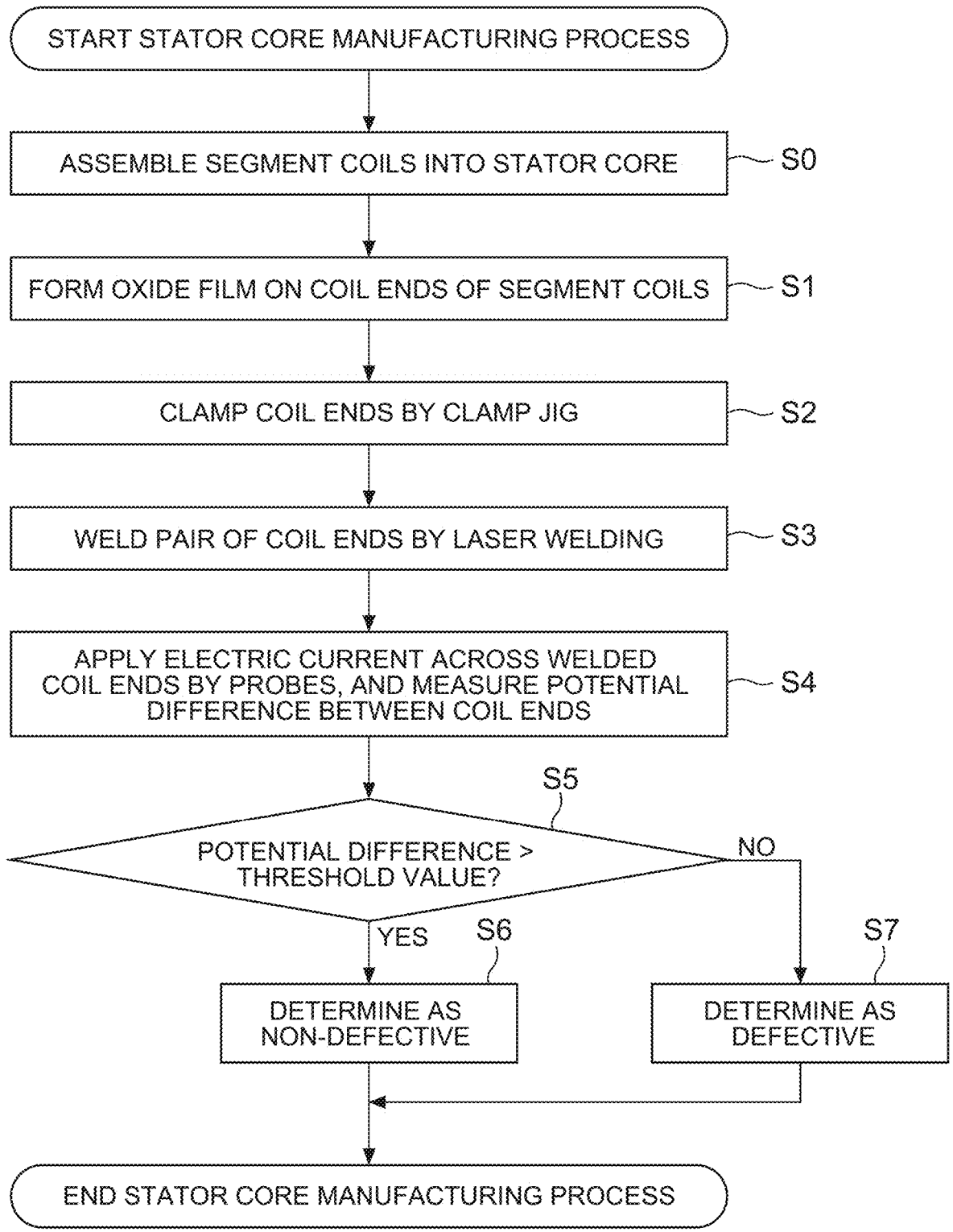
FIG. 3 is a flowchart showing a manufacturing process of a stator according to the first embodiment.

FIG. 3 is a flowchart showing a manufacturing process of the stator according to the first embodiment. As shown in FIG. 3, in the manufacturing process of the stator 1 according to the first embodiment, first, a segment coil assembling process is performed, in which the coil 3 is assembled into the stator core 2 (step S0). More specifically, in the segment coil assembling process, in a state in which the segment coils are assembled to slots of the stator core 2 at predetermined positions provided from the inner side in the radial direction of the stator core 2 toward the outer side thereof, the segment coils are attached to the stator core such that the exposed coil ends are bent toward sides opposite to each other in the circumferential direction.

Next, an oxide film forming process, in which an oxide film is formed at places of the coil ends 5 of the segment coils 4 where an insulating film has been removed, is performed (step S1). Next, the weld portion 6 of the coil ends 5 is clamped by a clamp jig (step S2). The coil ends are then welded by laser welding, in a state in which the weld portion 6 is clamped (step S3). The welding ends in this step S3, but in the manufacturing process of the stator 1 according to the first embodiment, inspection of the weld area of the weld portion 6 is subsequently performed, thereby determining whether the stator 1 following welding is a non-defective article or a defective article.

In this inspecting process, first, probes are brought into contact with the weld faces of the welded coil ends to apply electric current thereto, the potential difference across the coil ends is measured (step S4), and the potential difference and a threshold value set in advance are compared (step S5), thereby performing a quality determining process (steps S6, S7) to determine the quality of the weld of the coil ends.

Figure 4:
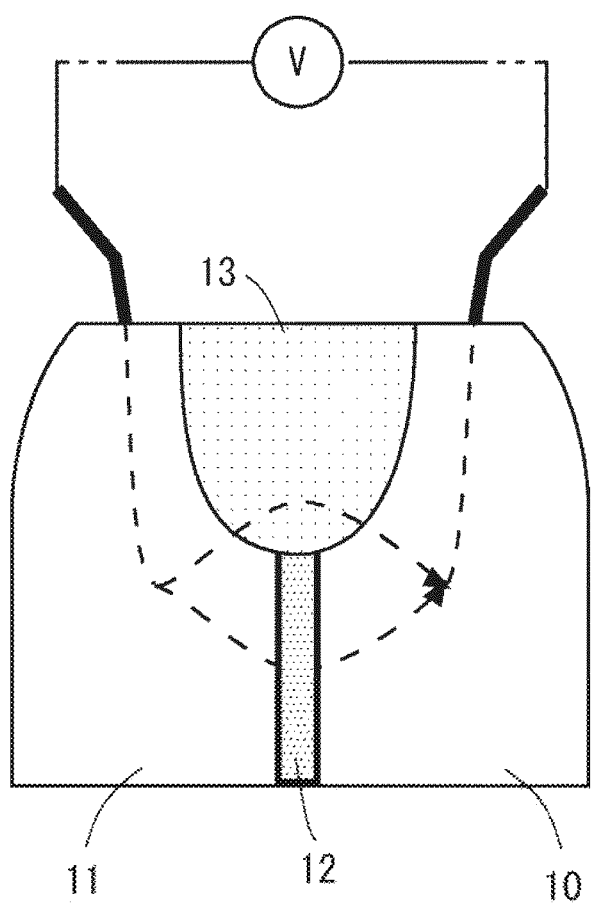
FIG. 4 is a diagram illustrating a weld area inspecting process for coil ends according to the first embodiment.

This inspecting process will be described in further detail here. To this end, FIG. 4 is a diagram illustrating a weld area inspecting process for coil ends according to the first embodiment. FIG. 4 is a cross-sectional view of the weld portion 6 of coil ends 5 after welding. As illustrated in FIG. 4, an inner-circumferential-side coil end 10 and an outer-circumferential-side coil end 11 are in contact across an oxide film 12 at the weld portion. The inner-circumferential-side coil end 10 and the outer-circumferential-side coil end 11 are in an electrically conducting state at a welded part 13 formed by laser welding. In the inspecting process, probes are brought into contact with the inner-circumferential-side coil end 10 and the outer-circumferential-side coil end 11 so that electric current flows to the coil ends via the welded part 13 formed after welding, and electric current is applied. The potential difference between the potential measured by the probe in contact with the inner-circumferential-side coil end 10 and the potential measured by the probe in contact with the outer-circumferential-side coil end 11 is then measured.

Note however, that variance in thickness occurs in the oxide film 12 formed between the inner-circumferential-side coil end 10 and the outer-circumferential-side coil end 11 in the welding process. In the inspecting process, the joining area of the welded part 13 is inspected by measuring the potential difference that occurs due to the magnitude of resistance at the welded part 13. However, when variance occurs in the thickness of the oxide film 12, the electric current for inspection may flow over the oxide film 12 side via the oxide film 12. Accordingly, the variance in thickness of the oxide film 12 becomes variance in potential difference measured in the inspecting process. That is to say, such variance in the measured potential difference is related to deterioration in inspection precision of the inspecting process. Accordingly, variance in film thickness of the oxide film 12 in the welding process is suppressed in the manufacturing method of the stator 1 according to the first embodiment, by using the clamp jig according to the first embodiment, which will be described below. The clamp jig according to the first embodiment will be described below in detail.

Figure 5:
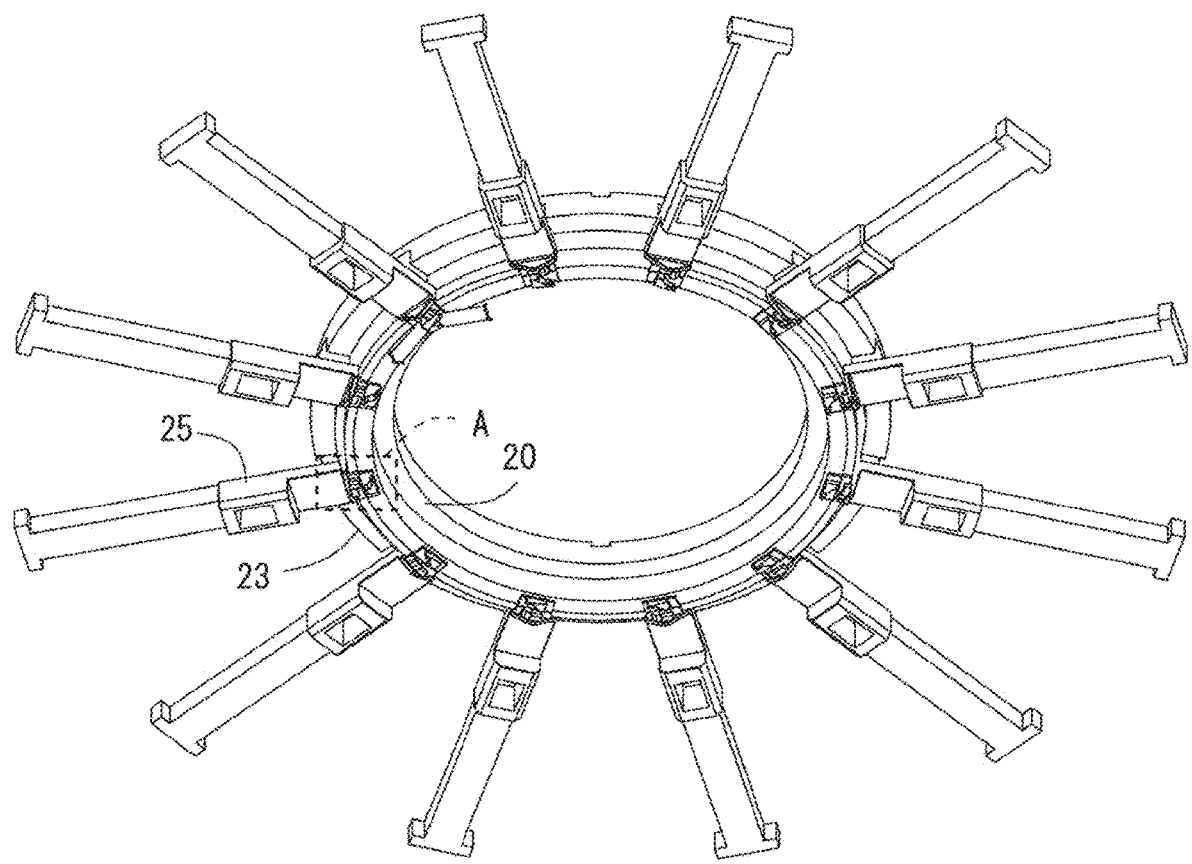
FIG. 5 is a schematic diagram of a stator-core-facing face of a clamp jig according to the first embodiment.

FIG. 5 is a schematic diagram of a stator-core-facing face of a clamp jig according to the first embodiment. As illustrated in FIG. 5, the clamp jig according to the first embodiment has an inner circumferential ring 20, an outer circumferential ring 23, and a radial pusher 25. The inner circumferential ring 20 is a ring provided on the inner circumferential side of the outer circumferential ring 23. The inner circumferential ring 20 and the outer circumferential ring 23 are linked so as to be relatively rotatable.

Now, the clamp jig has a clamping structure that clamps the inner-circumferential-side coil end 10 and the outer-circumferential-side coil end 11 configured in a region A in FIG. 5. The clamping structure of the clamp jig will be described in detail now. To this end, FIG. 6 is a cross-sectional view illustrating the shape of the clamp jig according to the first embodiment.

Figure 6:
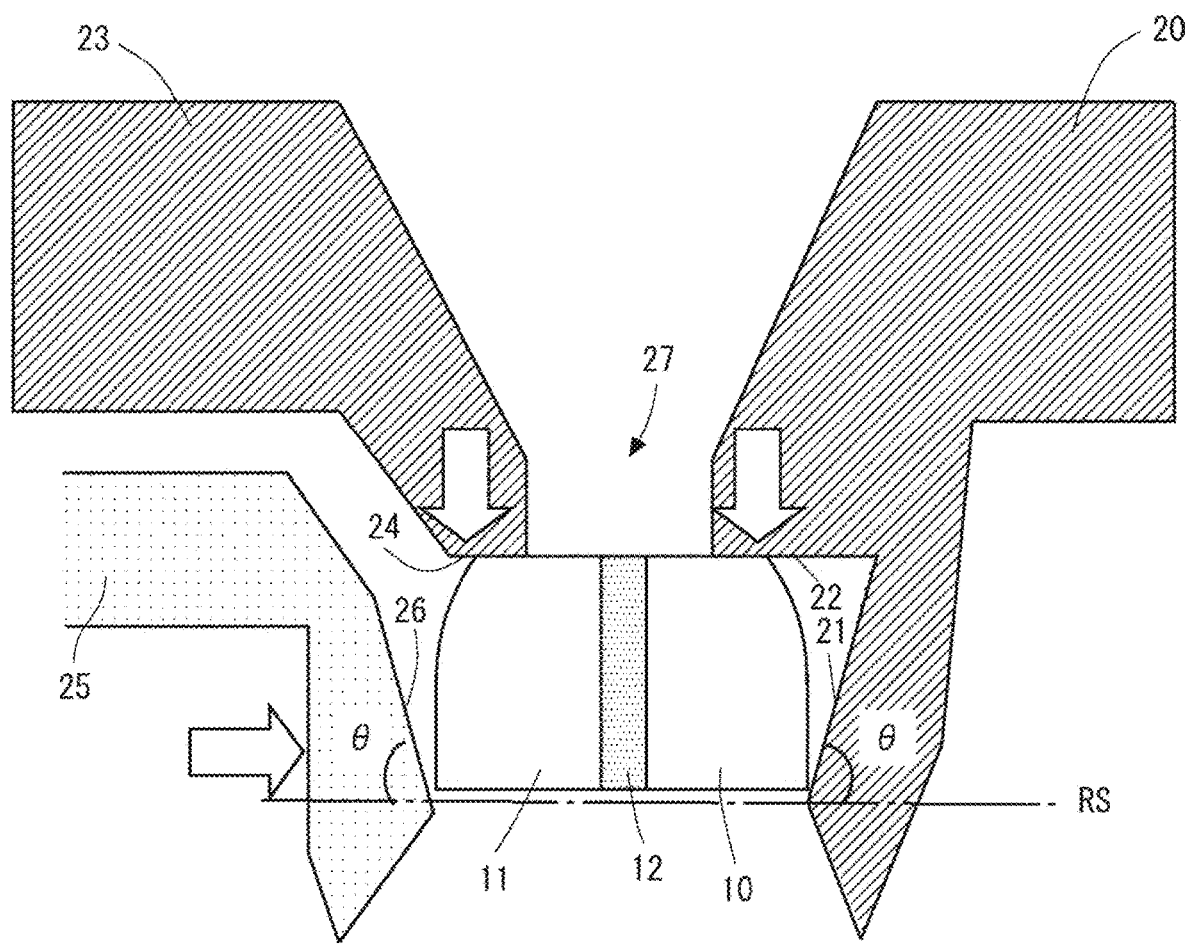
FIG. 6 is a cross-sectional view illustrating the shape of the clamp jig according to the first embodiment.

As illustrated in FIG. 6, the inner circumferential ring 20 has a sideward pressing face (inner-circumferential-side sideward pressing face 21) and a downward pressing face (e.g., inner-circumferential-side downward pressing face 22). Of the sideward pressing faces coming into contact with the side faces of the coil ends 5 that are provided so as to be orthogonal to the weld faces of the coil ends 5, the inner-circumferential-side sideward pressing face 21 is formed on the inner circumferential ring 20 side. The inner-circumferential-side downward pressing face 22 is a face that applies the pressing force toward the stator core 2 to a region excluding a portion exposed through an opening portion 27 at the weld face. More specifically, out of downward pressing faces, the inner-circumferential-side downward pressing face 22 is a downward pressing face that applies pressing force to the inner-circumferential-side coil end 10 that is positioned on the inner circumferential side, out of the coil ends.

The outer circumferential ring 23 has a downward pressing face (e.g., outer-circumferential-side downward pressing face 24). The outer-circumferential-side downward pressing face 24 is a face that applies the pressing force toward the stator core 2 to a region excluding the portion exposed through the opening portion 27 at the weld face. More specifically, the outer-circumferential-side downward pressing face 24 is a downward pressing face that, out of the downward pressing faces, applies the pressing force to the outer-circumferential-side coil end 11 that is positioned on the outer circumferential side, out of the coil ends.

The radial pusher 25 has a sideward pressing face (e.g., outer-circumferential-side sideward pressing face 26). The radial pusher 25 applies the pressing force in a direction from the outer circumferential ring 23 toward the inner circumferential ring 20. The outer-circumferential-side sideward pressing face 26 is provided on an end portion of the radial pusher 25 on the inner circumferential ring 20 side. In other words, the outer-circumferential-side sideward pressing face 26 is provided on an end portion of the radial pusher 25 that faces the inner circumferential ring 20. The outer-circumferential-side sideward pressing face 26 comes in contact with the side face of the coil end 5 provided orthogonal to the weld face. More specifically, the outer-circumferential-side sideward pressing face 26 is a sideward pressing face that, out of the sideward pressing faces, comes into contact with the outer-circumferential-side coil end 11.

In the clamp jig according to the first embodiment, a pressuring structure is provided on at least one of the inner-circumferential-side sideward pressing face 21 and the outer-circumferential-side sideward pressing face 26 such that a pressing force increases in a direction away from the weld faces of the coil ends 5 welded in the welding process. In the example illustrated in FIG. 6, pressuring structures are provided on both the inner-circumferential-side sideward pressing face 21 and the outer-circumferential-side sideward pressing face 26.

The pressuring structures have tapered shapes in which the distances from the pressure structures to the respective side faces of the coil ends 5 at a portion near the weld faces (e.g., the upper-side faces of the inner-circumferential-side coil end 10 and the outer-circumferential-side coil end 11 in FIG. 6) are longer than the distances from the pressure structures to the side faces of the coil ends 5 at a portion far from the weld faces. Also, with a plane extending in the direction in which the sideward pressing force of the clamp jig is applied as a reference plane RS, the portions with tapered shapes have an inclination that is equal to or smaller than 85° as to the reference plane RS. In the example in FIG. 6, an angle θ formed between the reference plane RS and the tapered shape portion of the inner-circumferential-side sideward pressing face 21 is equal to or smaller than 85°.

Figure 7:
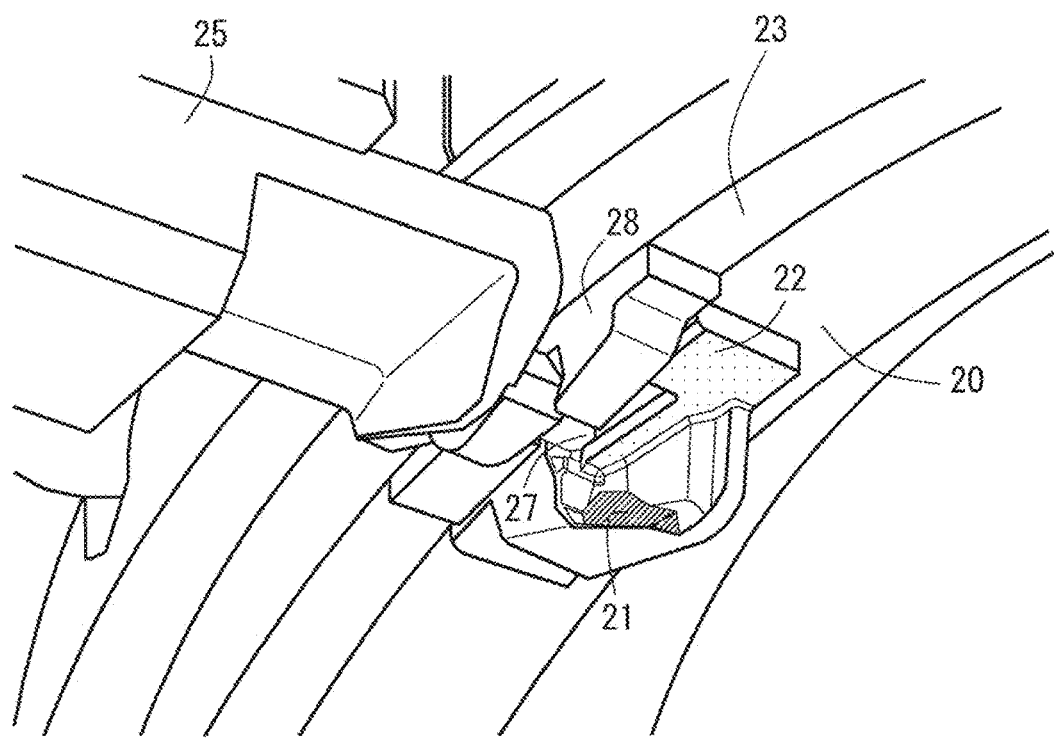
FIG. 7 is a diagram illustrating a structure of an inner-circumferential-ring side of the clamp jig according to the first embodiment.
Figure 8:
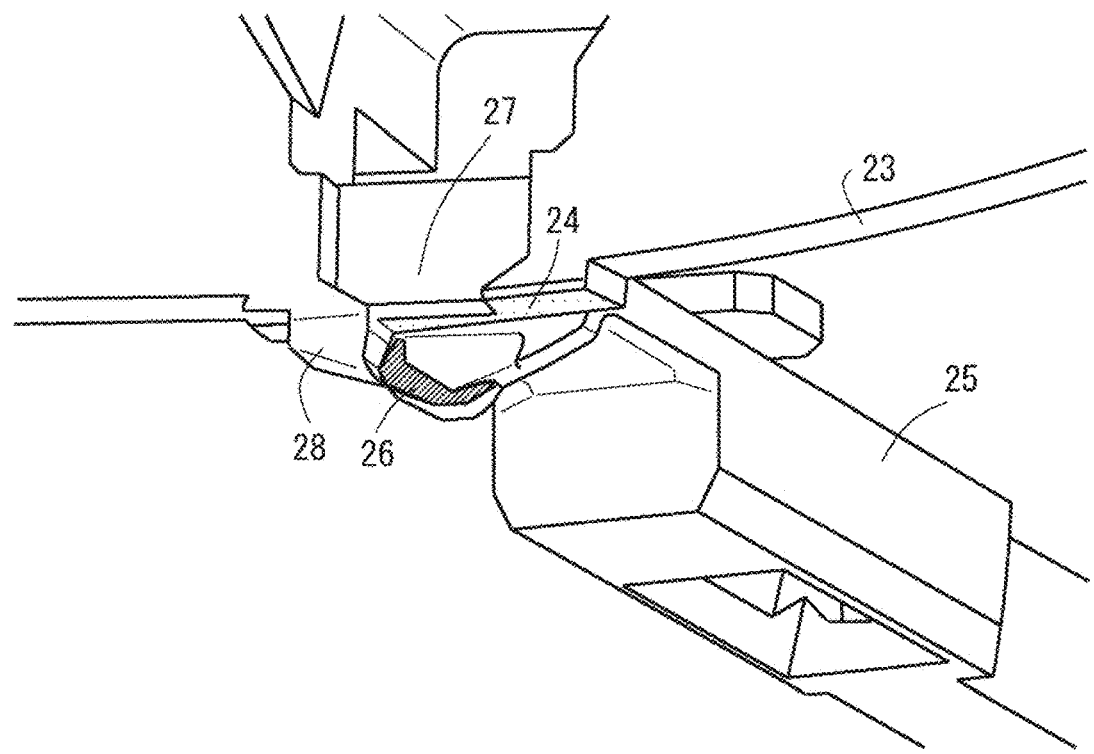
FIG. 8 is a diagram illustrating structures of a radial pusher and an outer-circumferential-ring side of the clamp jig according to the first embodiment.

Next, the clamping structure of the clamp jig will be described in detail with reference to FIGS. 7 and 8. Now, FIG. 7 is a diagram illustrating the structure of the inner circumferential ring 20 side of the clamp jig according to the first embodiment. As illustrated in FIG. 7, the inner circumferential ring 20 has a protruding portion that protrudes toward the stator core 2 side, with the inner-circumferential-side downward pressing face 22 and the inner-circumferential-side sideward pressing face 21 formed at this protruding portion. In the example illustrated in FIG. 7, the tapered shape portion of the inner-circumferential-side sideward pressing face 21 is indicated by hatching. Also, in the example illustrated in FIG. 7, the tapered shape portion of the inner-circumferential-side sideward pressing face 21 is formed only on part of the lower side of the inner-circumferential-side sideward pressing face 21, unlike in FIG. 6. Also, a recessed portion that makes up part of the opening portion 27 is formed on the inner circumferential ring 20.

The outer circumferential ring 23 has a protruding portion 28 that protrudes to the stator core 2 side, as illustrated in FIG. 7. The protruding portion 28 is for positioning the end portion of the outer-circumferential-side coil end 11. Also, FIG. 8 is a diagram illustrating the structure of the outer circumferential ring 23 side and the structure of the radial pusher 25 of the clamp jig according to the first embodiment. As illustrated in FIG. 8, a recessed portion that makes up part of the opening portion 27 is formed. Also, the outer-circumferential-side downward pressing face 24 is formed on the outer circumferential ring 23. Also, the outer-circumferential-side sideward pressing face 26 is formed on the end portion of the radial pusher 25. In the example illustrated in FIG. 8, the tapered shape portion of the outer-circumferential-side sideward pressing face 26 is formed only on part of the lower side of the outer-circumferential-side sideward pressing face 26, unlike in FIG. 6.

Figure 9:
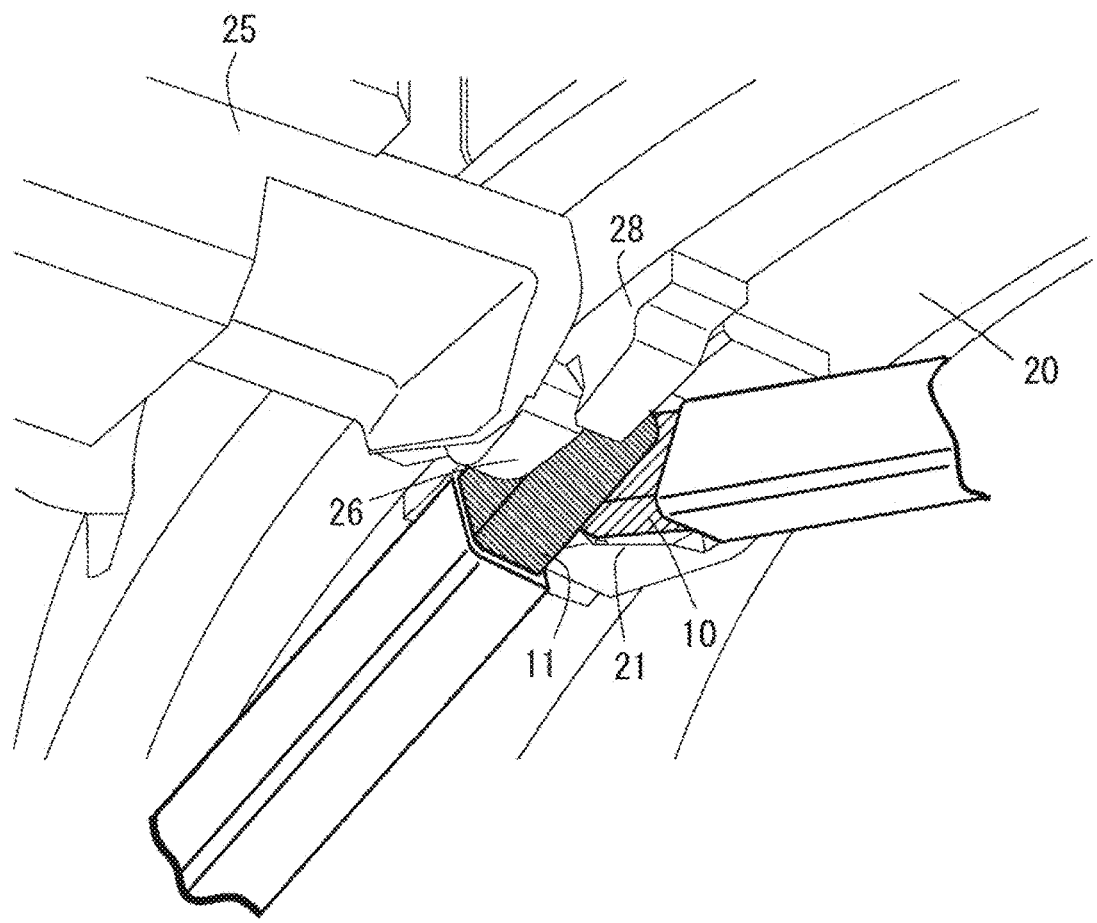
FIG. 9 is a diagram illustrating a state in which coil ends are clamped by the clamp jig according to the first embodiment.

Also, FIG. 9 is a diagram illustrating a state in which coil ends are clamped by the clamp jig according to the first embodiment. As illustrated in FIG. 9, of the coil ends 5, the inner-circumferential-side coil end 10 is held by the inner circumferential ring 20. Also, of the coil ends 5, the outer-circumferential-side coil end 11 is held by the outer circumferential ring 23. At this time, in the clamp jig according to the first embodiment, the coil ends 5 are clamped such that a greater pressing force is applied to the lower faces (faces opposite to the weld faces) of the coil ends 5 by the outer-circumferential-side sideward pressing face 26 and the inner-circumferential-side sideward pressing face 21.

Also, the coil ends 5 are formed inclining with a predetermined angle θb to the reference plane RS extending in the pressing direction in which the pressing force of the clamp jig is applied. Accordingly, the inner-circumferential-side sideward pressing face 21 and the outer-circumferential-side sideward pressing face 26 are formed to be inclined matching this angle θb in the clamp jig. The slants of the inner-circumferential-side sideward pressing face 21 and the outer-circumferential-side sideward pressing face 26 in the circumferential direction will be described with reference to FIGS. 10 through 12.

Figure 10:
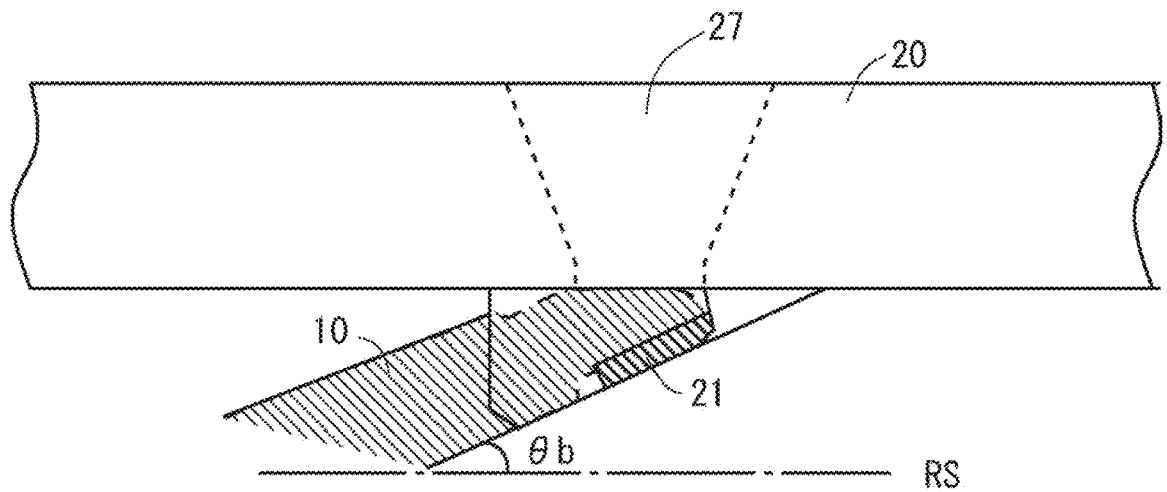
FIG. 10 is a diagram illustrating a relation between a slant of a pressuring structure portion of the inner-circumferential-ring side of the clamp jig according to the first embodiment and a slant of the segment coil.
Figure 11:
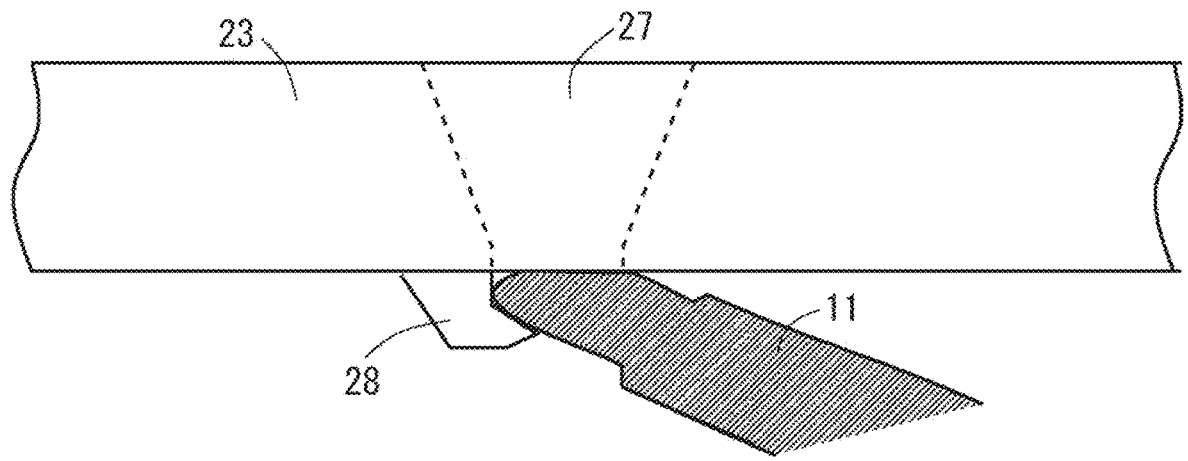
FIG. 11 is a diagram illustrating a relation between the structure of the outer-circumferential-ring side of the clamp jig according to the first embodiment and the slant of the segment coil, and is a side view illustrating a relation between an outer-circumferential ring with no radial pusher and the coil end.
Figure 12:
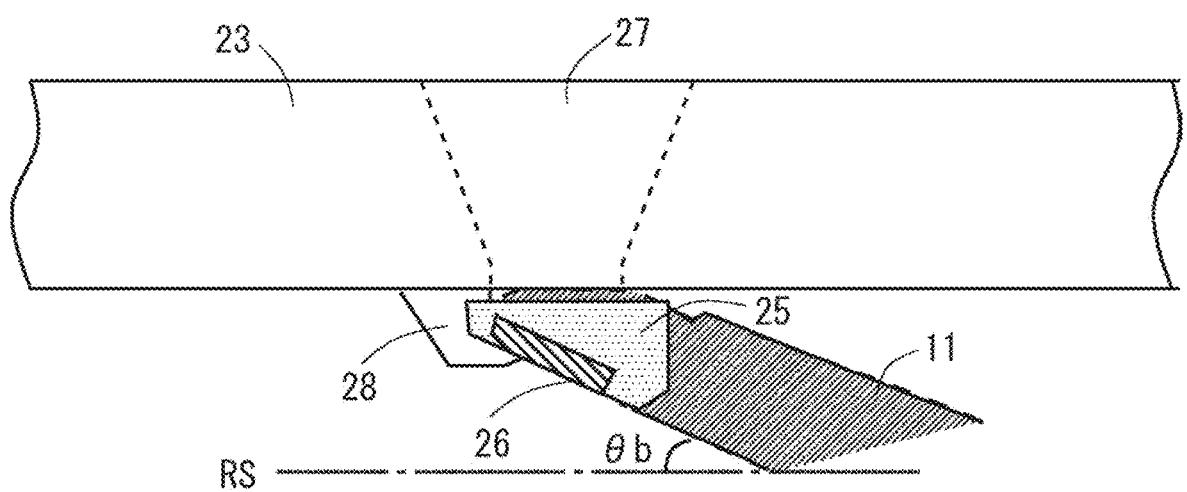
FIG. 12 is a diagram illustrating a relation between the slant of the radial-pusher side of the pressuring structure portion of the clamp jig according to the first embodiment and the slant of the segment coil, FIG. 12 illustrating a relation between the outer-circumferential ring with a radial pusher and the coil end.

FIG. 10 is a diagram illustrating the relation between the slant of the pressuring structure portion of the inner circumferential ring 20 side of the clamp jig according to the first embodiment, and the slant of the segment coil. FIG. 11 is a diagram illustrating the relation between the structure of the outer circumferential ring 23 side of the clamp jig according to the first embodiment and the slant of the segment coil. FIG. 12 is a diagram illustrating a relation between the slant of the pressuring structure portion of the radial-pusher side of the clamp jig according to the first embodiment and the slant of the segment coil.

As illustrated in FIG. 10, the inner-circumferential-side sideward pressing face 21 of the inner circumferential ring 20 is formed with a slant matching the inclination of the lower face of the coil end 5 opposite to the weld face. Also, as illustrated in FIG. 11, the end portion of the outer-circumferential-side coil end 11 is fixed by the protruding portion 28 of the outer circumferential ring 23. Also, as illustrated in FIG. 12, the outer-circumferential-side sideward pressing face 26 of the radial pusher 25 is formed with a slant matching the inclination of the lower face of the coil end 5 opposite to the weld face. By forming the inner-circumferential-side sideward pressing face 21 and the outer-circumferential-side sideward pressing face 26 that are inclined so as to match the slants of the inner-circumferential-side coil end 10 and the outer-circumferential-side coil end 11, the pressing force can be applied to the coil ends that are to be clamped.

Next, operations of clamping the coil ends 5 by the clamp jig according to the first embodiment will be described. In the clamping process according to the first embodiment, the coil ends 5 are clamped by the clamp jig by moving both the clamp jig and the stator 1. Accordingly, the clamping process will be described with reference to FIGS. 13 through 15.

Figure 13:
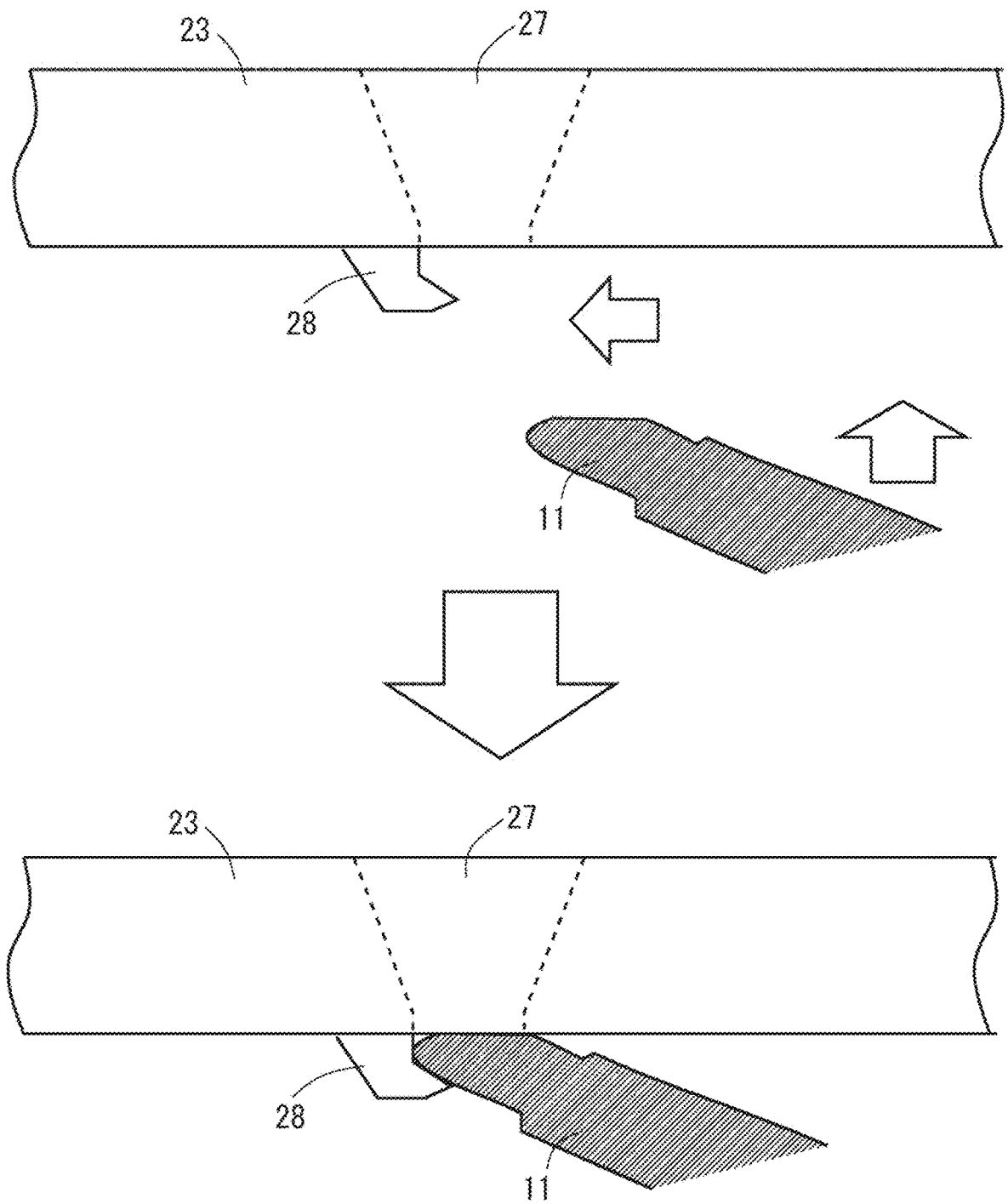
FIG. 13 is a diagram illustrating movement of the clamp jig and the stator core when clamping the coil end using the clamp jig according to the first embodiment, illustrating fixing the outer-circumferential ring and raising the stator core while rotating.

FIG. 13 is a diagram illustrating movement of the clamp jig and the stator core when clamping the coil end using the clamp jig according to the first embodiment. In particular, FIG. 13 is a diagram illustrating an operation of fitting the end portion of the outer-circumferential-side coil end 11 to the protruding portion 28 of the outer circumferential ring 23 by movement of the outer circumferential ring 23 and the stator core 2. As illustrated in FIG. 13, in this operation, the outer-circumferential-side coil end 11 is fit into the protruding portion 28 by raising the stator 1 while rotating.

FIG. 14 is a diagram illustrating movement of the clamp jig and the stator core when clamping the coil end using the clamp jig according to the first embodiment. In particular, FIG. 14 is a diagram illustrating an operation of fitting the end portion of the inner-circumferential-side coil end 10 to the inner-circumferential-side sideward pressing face 21 provided to the inner circumferential ring 20 by movement of the inner circumferential ring 20 and the stator core 2. As illustrated in FIG. 14, in this operation, the inner circumferential ring 20 is rotated in the same direction as the stator core 2 and at a speed faster than the stator core 2. Accordingly, the end portion of the inner-circumferential-side coil end 10 is fit into the portion where the inner-circumferential-side sideward pressing face 21 is formed. The operation illustrated in FIG. 13 and the operation illustrated in FIG. 14 may be performed at the same time, or may be performed as separate operations.

Figure 15:
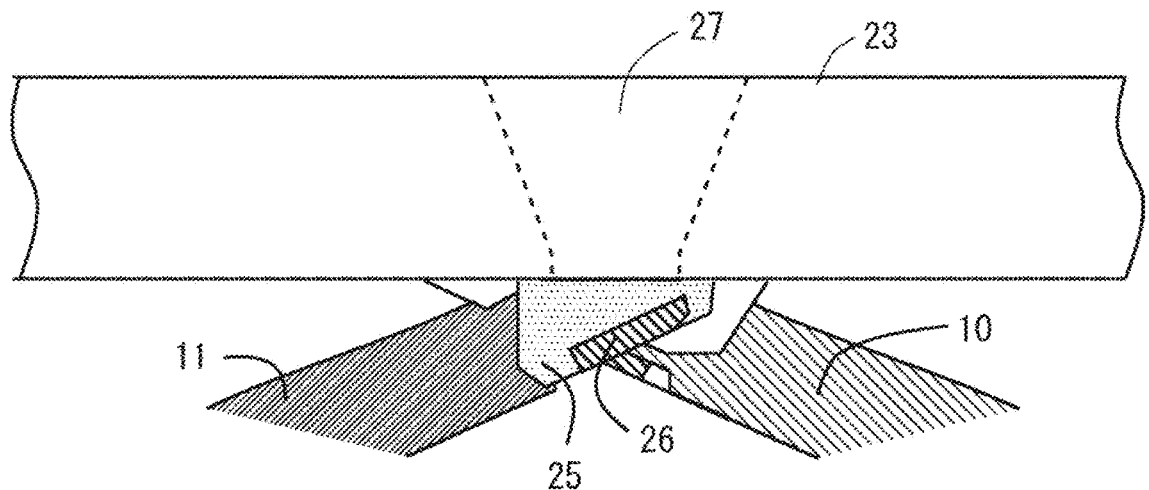
FIG. 15 is a diagram illustrating movement of the clamp jig and the stator core when clamping the coil ends using the clamp jig according to the first embodiment, FIG. 15 illustrating that the radial pusher is pressed against a side face of the coil ends.

FIG. 15 is a diagram illustrating movement of the clamp jig and the stator core when clamping the coil ends using the clamp jig according to the first embodiment. In particular, FIG. 15 illustrates operations of pressing the radial pusher 25 against the coil ends to be clamped. As illustrated in FIG. 15, pressing the radial pusher 25 against the side faces of the coil ends fixed by the inner circumferential ring 20 and the outer circumferential ring 23 enables a higher pressing force to be applied to the lower side of the coil ends than to the weld face side.

Figure 16:
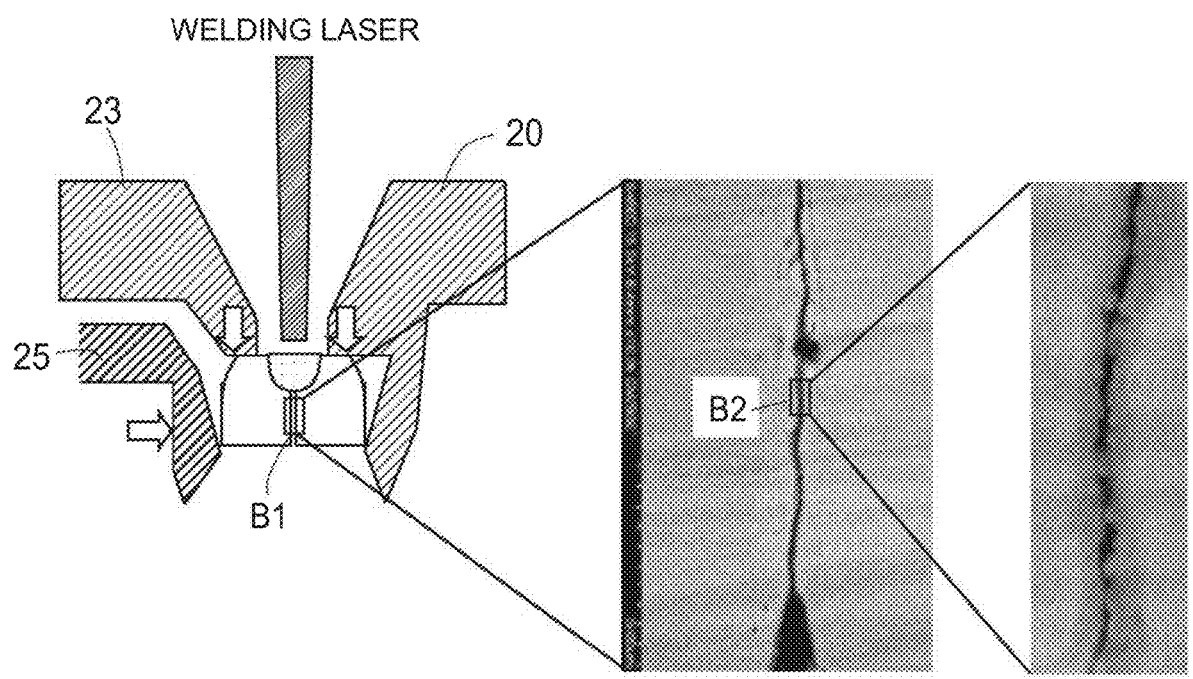
FIG. 16 is a diagram illustrating a state of coil ends welded using the clamp jig according to the first embodiment.

Next, the state of the oxide film 12 that has undergone the welding process performed in a clamped state using the clamp jig according to the first embodiment will be described. To this end, FIG. 16 is a diagram illustrating a state of coil ends welded using the clamp jig according to the first embodiment. A welding laser is illustrated between the inner circumferential ring 20 and the outer circumferential ring 23 in FIG. 16. Illustrated in FIG. 16 are an enlarged view of a region B1 where the oxide film 12 remains after laser welding in a clamped state using the clamp jig according to the first embodiment, and a state of a region B2 within the region B1 at which the oxide film becomes relatively thin. It can be understood from the illustration in FIG. 16 that by using the clamp jig according to the first embodiment, the oxide film 12 remains in a relatively good state even after the inner-circumferential-side coil end 10 and the outer-circumferential-side coil end 11 are welded.

Figure 17:
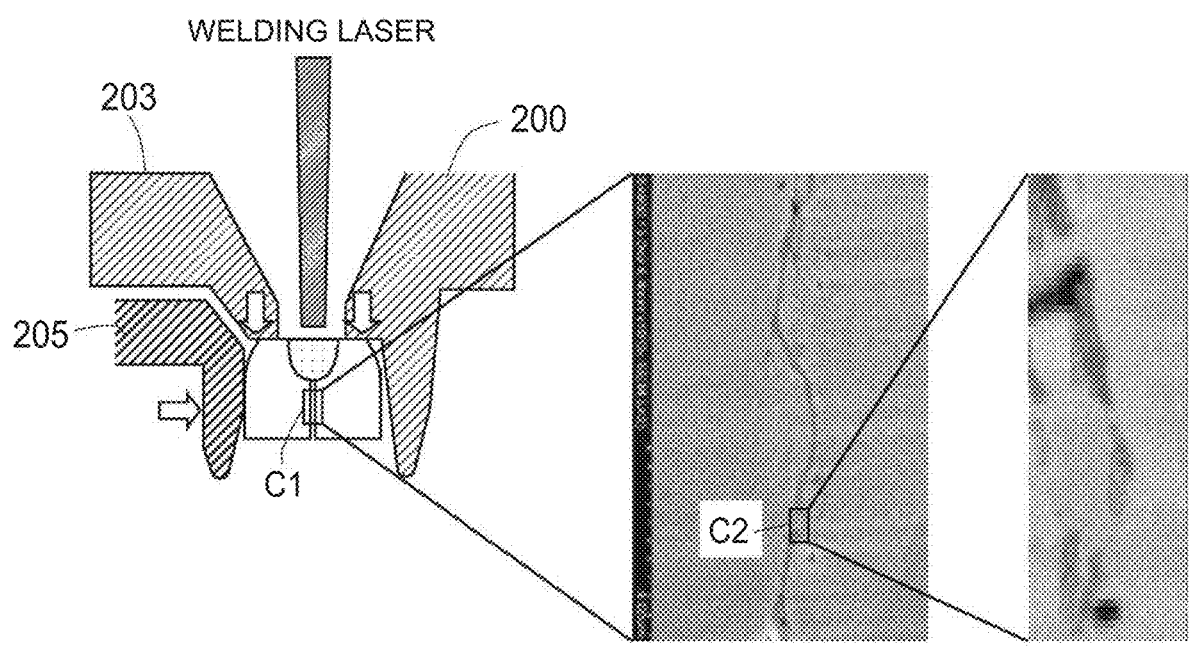
FIG. 17 is a diagram illustrating a state of coil ends welded using a clamp jig according to a comparative example.

In order to explain more clearly that the remaining state of the oxide film 12 is good, a diagram of a state of coil ends welded using a clamp jig according to a comparative example is illustrated in FIG. 17. In this comparative example, a clamp jig was used in which the pressing force was uniform in the height direction for the inner-circumferential-side coil end 10 and the outer-circumferential-side coil end 11 to be clamped, or higher around the middle portion in the height direction thereof. The clamp jig according to this comparative example has an inner circumferential ring 200, an outer circumferential ring 203, and a radial pusher 205. A welding laser is illustrated between the inner circumferential ring 200 and the outer circumferential ring 203 in FIG. 17. Illustrated in FIG. 17 are an enlarged view of a region C1 where the oxide film 12 remains after laser welding in a state clamped using the clamp jig according to the comparative example, and a state of a region C2 within the region C1 at which the oxide film becomes relatively thin. It can be understood from the illustration in FIG. 17 that the oxide film 12 is damaged in the region C2, and that the metal making up the inner-circumferential-side coil end 10 and the metal making up the outer-circumferential-side coil end 11 are in contact with each other, without the oxide film 12 interposed therebetween. The level of this contact causes variance in the measurement results.

Figure 18A:
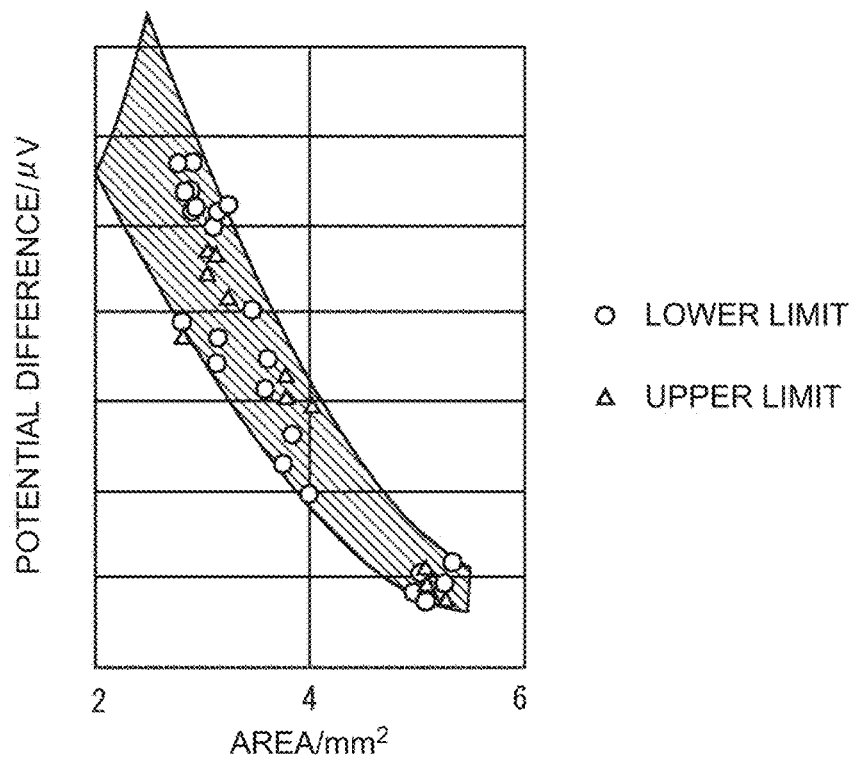
Figure 18B:
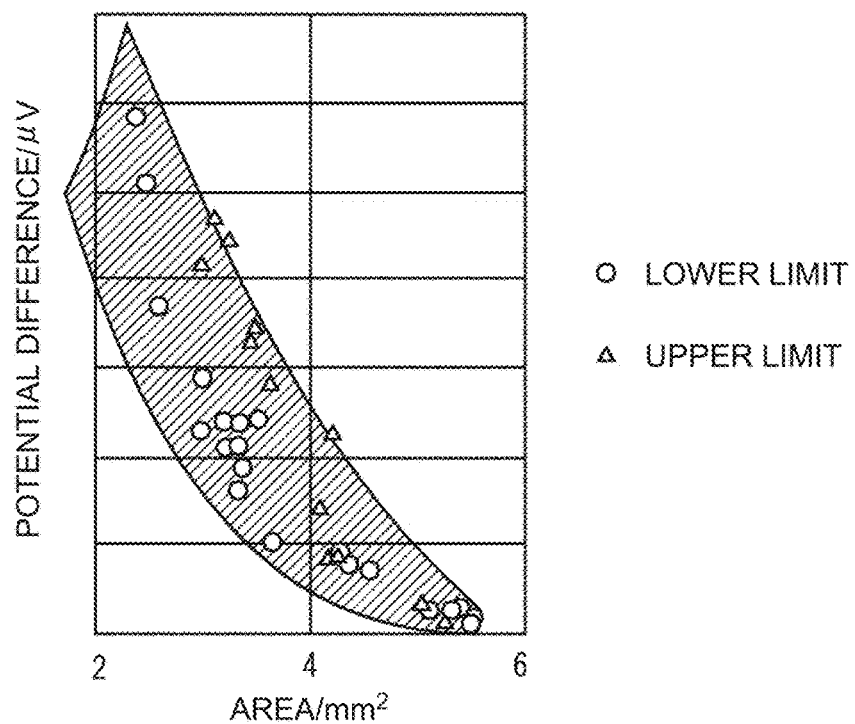

The ability to suppress variance in measurement results by using the clamp jig according to the first embodiment will be described next. FIGS. 18A and 18B are graphs showing variance in potential difference measured in the inspecting process as to weld area. FIG. 18A is a graph showing the relation between the weld area after welding while clamped using the clamp jig according to the first embodiment and the measured potential difference, and FIG. 18B is a graph showing the relation between the weld area after welding while clamped using the clamp jig according to the comparative example and the measured potential difference. It can be seen from FIGS. 18A and 18B that the variance in potential difference, measured when the weld area was the same, was smaller when using the clamp jig according to the first embodiment.

From the above description, the clamp jig according to the first embodiment has a pressuring structure that applies the pressing force that increases in a direction away from the weld face when welding the inner-circumferential-side coil end 10 and the outer-circumferential-side coil end 11. Accordingly, the oxide film 12 remaining after welding can be maintained in a good state. Due to the oxide film 12 maintained in a good state, variance in potential difference measured when inspecting the weld area can be suppressed, and inspection precision can be raised in the first embodiment.

Although the disclosure made by the present inventor has been described in detail based on an embodiment, it is needless to say that the disclosure is not limited to the above-described embodiment, and that various modifications can be made without departing from the essence thereof

What is claimed is:

1. A manufacturing method of a stator, the manufacturing method comprising:
   a segment coil assembling process of attaching segment coils to a stator core such that coil ends that are exposed are bent toward sides opposite to each other in a circumferential direction, while the segment coils are in a state of being attached to slots of the stator core at predetermined positions provided from an inner side in a radial direction of the stator core toward an outer side in the radial direction of the stator core;
   a clamping process of clamping, among the coil ends of the segment coils assembled into the stator core, a pair of coil ends adjacent to each other in the radial direction, by a clamp jig that presses the pair of coil ends in the radial direction; and a welding process of welding the pair of coil ends exposed through an opening portion provided in the clamp jig, wherein the clamp jig includes a pressuring structure that increases a pressing force in a direction away from weld faces of the coil ends welded in the welding process, the pressuring structure being provided on at least one of sideward pressing faces that come into contact with side faces of the coil ends that are provided orthogonal to the weld faces, and wherein the pressuring structure has a tapered shape in which a distance from the pressuring structure to one of the side faces of the coil ends at a portion near the weld faces is longer than a distance from the pressuring structure to the one of the side faces of the coil ends at a portion far from the weld faces, the one of the side faces facing the pressuring structure.

2. The manufacturing method according to claim 1, further comprising a quality determining process of determining quality of a weld of the coil ends by, following the welding process, bringing probes into contact with the weld faces of the coil ends to apply electric current, measuring a potential difference across the probes, and comparing the potential difference and a threshold value set in advance.

3. The manufacturing method according to claim 1, wherein the clamp jig further includes a downward pressing face that applies a pressing force toward the stator core to a region excluding a portion exposed through the opening portion at the weld faces.

4. The manufacturing method according to claim 1, wherein a portion with the tapered shape has an inclination that is equal to or smaller than 85° from a reference plane that extends in a direction of a sideward pressing force being applied by the clamp jig.

5. The manufacturing method according to claim 1, wherein the pressuring structure is configured with a slant matching an inclination of each of lower faces of the coil ends opposite to the weld faces.

* * * * *